(No Model.)
E. PECKHAM.
CAR WHEEL.
No. 356,886. Patented Feb. 1, 1887.
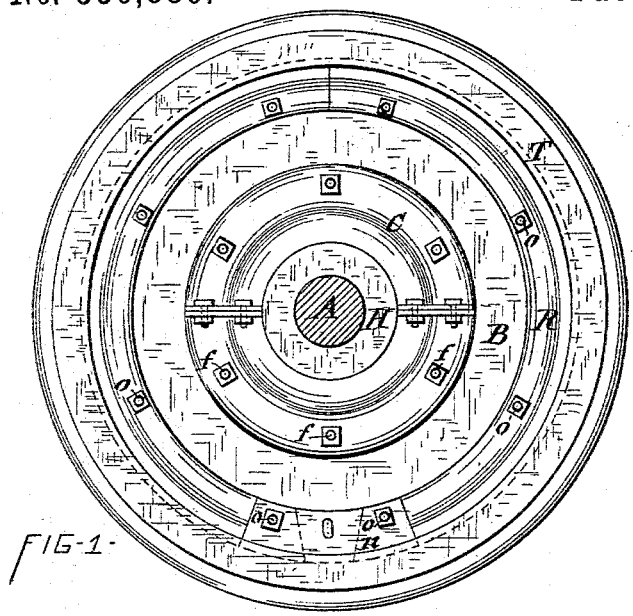
FIG-1-
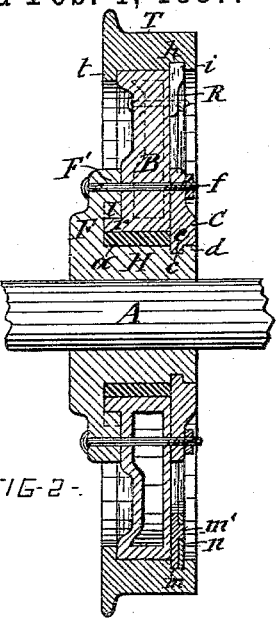
FIG-2-
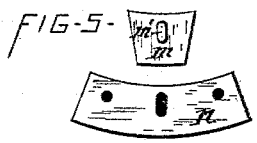
FIG-5-
FIG-6-
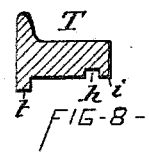
FIG-8-
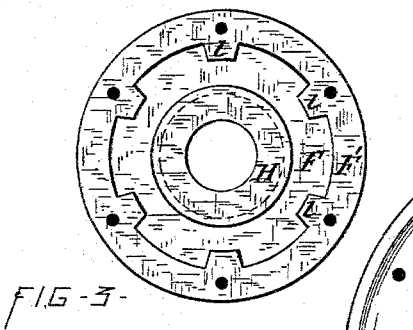
FIG-3-
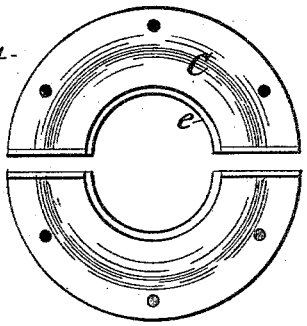
FIG-4-
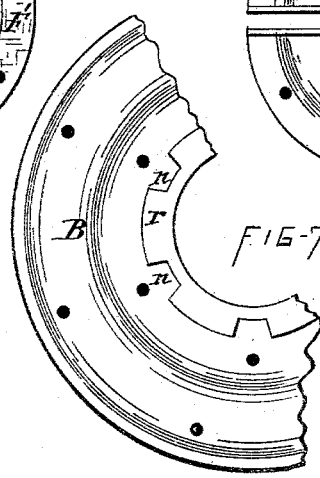
FIG-7-
WITNESSES:
C. Bendixon
A. F. Walz
INVENTOR
Edgar Peckham
BY
Duell, Leass & Hey
ATTORNEYS

UNITED STATES PATENT OFFICE.

EDGAR PECKHAM, OF SYRACUSE, NEW YORK.

CAR-WHEEL.

SPECIFICATION forming part of Letters Patent No. 356,885, dated February 1, 1887.

Application filed August 2, 1886. Serial No. 209,758. (No model.)

*To all whom it may concern:*

Be it known that I, EDGAR PECKHAM, of Syracuse, in the county of Onondaga, in the State of New York, have invented new and useful Improvements in Car-Wheels, of which the following, taken in connection with the accompanying drawings, is a full, clear, and exact description.

This invention consists in a novel construction of a car-wheel composed of concentric sections arranged one over the periphery of the other and a soft-metal bush inserted in the joint of said sections to relieve the wheel from the crystallizing influences and undue strain incident to the jars the wheel is subjected to and render it noiseless, all as hereinafter more fully described, and summed up in the claims.

The invention is fully illustrated in the annexed drawings, wherein—

Figure 1 is a side elevation of my improved car-wheel. Fig. 2 is a transverse section of the same. Fig. 3 is a side view of the hub, bare of the other parts of the wheel. Fig. 4 is a detached side view of the collar by which the web or body of the wheel is retained on the hub. Fig. 5 is a detached side view of the key by which the tire-retaining ring is secured in its seat on the tire. Fig. 6 is a detached side view of the clamp by which the aforesaid key is retained in position. Fig. 7 is a detail view of the inner face of the body or web of the wheel, and Fig. 8 is a detached transverse sectional view of the tire.

Similar letters of reference indicate corresponding parts.

A represents a car-axle, and H the hub of the wheel, which hub is rigidly secured to the axle in any suitable and well-known manner. The inner end of the hub is formed with a circumferential flange, F, and with a circumferential rib, F', on the side of said flange facing toward the outer end of the hub, and from this rib part way toward the hub project lugs $l\,l$.

$a$ denotes a bushing or sleeve of either Babbitt metal or lead, or copper, or other suitable soft metal, extending from the flange F part way the length of the hub, and at the outer end of said bushing is a circumferential groove, $c$, in the hub, leaving a collar, $d$, at the outside of the groove.

On the soft-metal bushing $a$ is seated and snugly fitted the web or body B of the wheel, which may be composed of either cast or wrought iron or steel, and may be either hollow or solid, or spoked, or of any other ordinary form.

Around the eye of the body B and integral therewith is an annular rib, $r$, projecting from the side thereof adjacent to the flange F of the hub, and in said rib are notches $n\,n$, coinciding with the lugs $l\,l$, which project into said notches and thus form a clutch which locks the body to the hub, so as to compel one to rotate with the other, and thus relieve the bolts, hereinafter described, from shearing strain. The lugs $l\,l$, extending only part way toward the hub, allow the body B to yield radially in its position and yet retain its bearing on the soft-metal bush.

On the outer side of the body B is a removable collar, C, which is divided diametrically into two sections, so as to allow the said collar to be seated into the groove $c$ of the hub. The eye of the collar C is formed with an inward-projecting flange, $e$, which enters the groove $c$ aforesaid, and the collar $d$, which is formed on the end of the hub, serves to retain the collar C on the hub. By means of bolts $f\,f$, passing through the collar C, body B, and flange F, the said collar is clamped against the side of the body B.

T represents the tire, preferably composed of steel. This tire I secure to the body B by forming the said tire with a circumferential rib, $t$, at one edge of the inner peripheral face thereof, which rib abuts against one side of the body B, as shown in Fig. 2 of the drawings.

At the opposite side of said body and adjacent thereto I provide the inner peripheral face of the tire with a circumferential groove, $h$, leaving a circumferential shoulder, $i$, at the outer side of the said groove, and into this groove I insert the retaining-ring R, which is composed of two or more segmental sections, so as to permit of its introduction into the groove. I prefer, however, to form it of two nearly semicircular sections and a key, $m$, entering between the ends of the aforesaid sections, as represented by dotted lines in Fig. 1 of the drawings. The key is provided with a lug, $m'$, on its outer side, and across the exterior of said key and adjacent end portions of the ring-sections I place a clamp or plate, n, which is provided with an eye for the reception of the lug m', and is secured in position by bolts o o, passing through said clamp and through the ring-sections and body B, as illustrated in Fig. 2 of the drawings. The ring R is further secured in its position by additional bolts, o o, passing through the ring and body B.

It will be observed that by the employment of the groove h and shoulder i on the inner peripheral face of the tire, with the retaining-ring R seated in said groove at one side of the body B, and the rib t formed on the tire at the opposite side of said body, the tire is confined laterally between shoulders formed integral with the tire, and therefore it is most securely retained in position.

I do not here claim, broadly, a car-wheel composed of a central body, a tire formed on its inner peripheral face, with shoulders or flanges at opposite sides of the aforesaid body, and a retaining-ring inserted between one of said shoulders and adjacent sides of the body. Such a combination of parts is shown in other applications for Letters Patent filed by me August 2 and August 4, 1886, Serial Nos. 209,759 and 209,942.

What I claim as new, and desire to secure by Letters Patent, is—

1. A car-wheel composed of a hub, a soft-metal bush encircling the hub, a web or annular body seated upon the said bush, and a tread on said body, substantially as set forth and shown.

2. The combination of the hub H, formed with the flange F, circumferential rib F', and lugs l l, projecting from said rib toward the hub, and the body B, formed with the annular rib r, projecting from the side thereof, and notches n in said rib, and the bush b, inserted between the hub and eye of the body, substantially as described and shown.

In testimony whereof I have hereunto signed my name and affixed my seal, in the presence of two attesting witnesses, at Syracuse, in the county of Onondaga, in the State of New York, this 31st day of July, 1886.

EDGAR PECKHAM. [L. S.]

Witnesses:
  C. H. DUELL,
  C. BENDIXON.